Patented May 19, 1953

2,639,295

UNITED STATES PATENT OFFICE 2,639,295

MANUFACTURE OF UNSATURATED ALDEHYDES

Hugh J. Hagemeyer, Jr., Kingsport, Tenn., assignor to Eastman Kodak Company, Rochester, N. Y., a corporation of New Jersey No Drawing. Application July 16, 1948, Serial No. 39,171

6 Claims. (Cl. 260—530)

This invention relates to the manufacture of unsaturated carbonyl compounds. More particularly this invention is concerned with a continuous catalytic fluid contact type of process for the direct preparation of unsaturated aldehydes such as acrolein, methacrolein, ethacrolein, and the like.

The manufacture of such type of carbonyl compound and in particular the unsaturated aldehydes referred to has already been extensively investigated by my co-workers, Brant, Gallagher, and Hasche, and processes for manufacturing such aldehydes are described in their Patents 2,245,582; 2,246,037; 2,294,955; and other related patents. This prior investigation by my colleagues has already developed and described the production of acrolein, methacrolein, etc., and the utilization and value of such type compounds as intermediates in the production of other materials and for other purposes. As has already been pointed out by my co-workers, while the condensation of an aldehyde with itself has been known for some time the condensation of two different aldehydes such as the condensation of formaldehyde with another carbonyl compound involves a number of special considerations. Likewise, while condensations have been described in certain foreign work in which amine compounds have been utilized in the reaction these foreign processes have involved stoichiometric amounts of the amine compound rather than catalytic amounts as used in the process of my invention as well as other distinguishing features as will be pointed out hereinafter.

I have found that the unsaturated aldehydes of the class indicated may be efficiently prepared by a catalytic type method which is thought to not only provide another and alternative type of method of producing these compounds but to constitute an improved process in certain respects such as a capability of operating at lower temperatures and the like as will be apparent from the description that follows.

This invention has for one object to provide a novel and improved method for the manufacture of unsaturated carbonyl compounds such as acrolein, methacrolein, and the like. Another object is to provide a process for manufacturing chemical compounds of the class indicated which is susceptible of operation under lower temperature conditions than heretofore used in certain of the prior art processes. Still another object is to provide a process for the reacting together of two aldehydes which is carried out with the utilization of a new class of catalysts in a type of reaction wherein there is fluid contact. A particular object is to provide a catalytic method that is especially adapted to the production of acroleins from the reaction of formaldehyde with another different aldehyde. Another object is to provide a method for regenerating the new type of catalyst aforesaid. Still a further object is to provide an improved continuous process of operation in carrying out the reactions of the class indicated. Other objects will appear hereinafter.

In the present invention I have found a different catalytic method of condensing formaldehyde with aliphatic aldehydes to form substantially quantitative yields of the unsaturated aldehydes of the same type as described by my co-workers in their patents, aforementioned. However, my process may be operated at lower temperatures and otherwise differently from the prior processes. The reaction is carried out in the presence of an ammonium salt or the salt of a primary or secondary amine. Typical of the catalysts which can be used in the present invention are: ammonium chloride, the hydrochlorides of methyl amine; ethyl amine, beta hydroxyethylamine, beta chloroethylamine, allylamine, benzylamine, beta phenyl ethyl amine, ethylenediamine, aniline, tetrahydro beta naphthylamine; the hydrochlorides of dimethyl, diethyl, diethanol, dipropyl, di-n-butyl, diisoamyl and dibenzyl amine; and the hydrochlorides of methyl diethyl-ethylenediamine, methylaniline, piperidine, morpholine, piperazine, and 1,2,3,4-tetrahydroisoquinoline. In addition to the hydrochlorides, the hydrobromides, sulfates, phosphates, etc., can also be used. The preferred catalysts are the secondary amine hydrogen halides.

With formaldehyde the reaction of the present invention can be represented by the equation:

$$CH_2O + RCH_2CHO \rightarrow CH_2=C(R)CHO + H_2O$$

wherein R is hydrogen, alkyl, or aryl. Formaldehyde can be condensed with acetaldehyde to form acrolein; with propionaldehyde to form alpha methacrolein; with butyraldehyde to form alpha ethacrolein; with phenyl acetaldehyde to form alpha phenyl acrolein; etc.

Other condensations not involving the use of formaldehyde can also be carried out according to the process of my invention e. g., acetaldehyde can be condensed with itself to form crotonaldehyde; with propionaldehyde to form alpha methyl crotonaldehyde; with butyraldehyde to form alpha ethyl crotonaldehyde; etc. Phenyl acetaldehyde and benzaldehyde also react in a similar fashion.

The general equation representing the reaction of the invention can be represented as follows:

$$R_1CHO + RCH_2CHO \rightarrow R_1CH=C(R)CHO$$

wherein $R_1$ is hydrogen, alkyl, aryl, or aralkyl and R has the significance described above.

A particular feature of the invention is the high yield of unsaturated aldehyde representing a cross-condensation product and the negligible formation of unsaturated aldehyde representing a homo condensation product.

The reaction of the present invention is carried out in the presence of a solution of only catalytic amounts of an amine salt, for example, in concentrations up to 25 percent at 60–400° C. The concentration of amine salt, for example, is not unduly exacting but the production capacity of a specific apparatus or reactor is somewhat in proportion to the concentration of the amine salt. The use of boiling temperatures, as will be described, is desirable in order to avoid the formation of amino methyl substituted aldehydes. In general the reaction is carried out by contacting formaldehyde either as formalin or paraformaldehyde and the other aldehyde to be reacted with a boiling solution of the amine salt while removing the unsaturated aldehyde as rapidly as it is formed. Where homo or heterocondensations involving aldehyde other than formaldehyde are desired the same procedure is used, e. g., crotonaldehyde is formed simply by feeding acetaldehyde into a boiling solution of an amine salt.

The reaction can be carried out at normal or reduced or increased pressures. Although temperatures in the range of 80–130° C. are usually sufficient higher temperatures can be used simply by feeding the aldehydes and the amine salt solution through a reactor heated to elevated temperatures and/or by heating at elevated pressures. With higher aldehydes insoluble in water, alcohols, acetic acid dioxane and other cosolvents can be used to form a homogeneous mixture.

Ordinarily a continuous type reactor is preferred and the reaction is conveniently carried out by passing the aldehydes to be condensed into the bottom of a scrubber countercurrent to the solution of the amine salt, in order to obtain fluid contact. The product is azeotroped off continuously at the top of the scrubber and condensed.

I have found that where formaldehyde or acetaldehyde is to be reacted with another aldehyde it is advantageous to use an excess of the second aldehyde in order to obtain a complete conversion in a single pass. Usually a 1–5 molar excess is sufficient and a molar excess less than one may be used. Under the conditions employed for my reaction the excess aldehyde is substantially unchanged and can be recovered as by distillation and recycled.

Among some of the advantages of the reaction of this invention the following may be mentioned. (1) 90–95 percent yields of the desired unsaturated aldehyde are obtained. (2) Formaldehyde dissolves in water to form methylene glycol $$CH_2O + H_2O \rightarrow HOCH_2OH$$

which permits the separation of the unsaturated aldehyde in the form of an aldehyde-water azeotrope substantially free of any traces of unreacted formaldehyde. (3) By careful control of reaction conditions the catalyst efficiency is essentially unchanged over long periods of time and a high ratio of product to catalyst loss is obtained. (4) The catalyst can be regenerated in its initially active state simply by heating at elevated temperatures, 150–300° C. (5) No catalyst neutralization or separation in the products of the reaction is required. (6) The reaction is carried out under neutral or mildly acid conditions, pH=4–6, such that the loss in yield due to the formation of aldol or other condensation products is reduced to a minimum.

It will be apparent to those skilled in the art that the processes and novel catalyst described above are broad and inclusive and certain variations are possible without departing from the spirit of this invention. The invention is further illustrated by the following examples.

*Example I*

A solution of catalytic amounts, namely 121 grams of piperidine hydrochloride in three liters of water is made up, heated at 90–98° C. and cycled through a glass scrubber, 1 in. I. D. and 6 feet high, packed with ¼ in. berl saddles. A solution of 1320 grams of acetaldehyde and 1,000 grams of formalin (30% formaldehyde) were added gradually to the base heater at the bottom of the scrubber. The scrubber was equipped with a reflux condenser in order to control the take off of the flash distillate. 473 grams of an acrolein-water azeotrope was distilled off in addition to 902 grams of acetaldehyde.

*Example II*

In the reactor and with the catalyst solution described in Example I alpha methacrolein was prepared as follows: 464 grams of propionaldehyde and 383 grams of formalin (35% formaldehyde, 10% methanol) were added to the base heater heated to 100° C. while cycling the catalyst solution through the scrubber. Unreacted propionaldehyde and the methacrolein water azeotrope were distilled off at the top of the scrubber continuously. Refractionation of the scrubber distillate gave 247 grams of unchanged propionaldehyde and 239 grams of methacrolein-water azeotrope, B. P.₇₃₅ 61–62° C.

*Example III*

In the reactor described in Example I and with a catalyst comprising a 10% solution of ammonium chloride, 464 grams of propionaldehyde and 383 grams of formalin were reacted at 95–98° C. The flash distillate was fractionated continuously and unchanged propionaldehyde was recycled to the scrubber base heater until a yield of 209 grams of alpha methacrolein-water azeotrope was obtained.

*Example IV*

Concentrated hydrochloric acid was added to a solution of 87 grams of morpholine in 2000 grams of water until the solution was acid to Congo red, pH=3.6. The catalyst solution was placed in a scrubber type reactor and heated to 95–100° C. The circulatory pump was started and a solution containing 11,600 grams of propionaldehyde and 8,600 grams of formalin (35% formaldehyde, 10% methanol) was fed in gradually at the bottom of the scrubber while flashing off the product continuously as distillate at the top of the scrubber. Fractionation of the distillate gave 5,637 grams of unchanged propionaldehyde and 6,860 grams of methacrolein-water azeotrope.

*Example V*

Using the catalyst solution and the reactor described in Example IV, 4,400 grams of acetaldehyde were converted to 3,243 grams of crotonaldehyde-water azeotrope. 264 grams of acetaldehyde were recovered unchanged.

Example VI 44 grams of acetaldehyde and 144 grams of normal butyraldehyde were fed gradually to a 5% solution of diethanol amine hydrochloride in a small scrubber heated to 95–100° C. The product was removed as distillate at the top of the scrubber. The product was fractionated and 91 grams of 2-ethyl crotonaldehyde were obtained in addition to 67 grams of unchanged butyraldehyde.

Example VII 144 grams of butyraldehyde and 85 grams of formalin (35% formaldehyde) together with 100 cc. of methanol were mixed together. The solution was fed gradually to the base heater of a scrubber through which a solution of 32 grams of ethanolamine hydrochloride in 300 cc. of water and heated at 90–95° C. was cycled. The product was distilled off at the top of the scrubber. Fractionation of the product gave 61 grams of unchanged butyraldehyde and 72 grams of alpha ethacrolein water azeotrope was obtained.

Example VIII

Methacrolein was prepared by adding a mixture of propionaldehyde and formalin (37% formaldehyde) to a 10% solution of piperidine hydrochloride in hot acetic acid. The reaction temperature was held between 105–115° C. while cycling the catalyst solution through an unpacked column 52 in. long and 1 in. I. D. The methacrolein-water azeotrope was flashed off continuously at the top of the column where the rate of removal was controlled by a reflux condenser. The following results were obtained.

| Run No. | Feed | | Methacrolein Conversion | PrH Recovery |
|---|---|---|---|---|
| | PrH | HcHO | | |
| 2,108-14 | 1,955 | 460 | 57.0 | 19.0 |
| 2,108-15 | 1,491 | 425 | 84.6 | 29.2 |
| 2,108-16 | 1,629 | 467 | 59.4 | 52.0 |
| 2,108-17 | 1,355 | 389 | 92.5 | 56.0 |
| 2,108-18 | 2,041 | 585 | 61.5 | 45.8 |
| 2,108-19 | 2,124 | 614 | 34.0 | 63.8 |

The mol feed ratio of propionaldehyde to formaldehyde was 5/1 and the conversion to methacrolein was based on the formaldehyde added.

Example IX

Crotonaldehyde was prepared by feeding acetaldehyde into a 10% solution of piperidine hydrochloride into boiling acetic acid. The hot catalyst solution was cycled through a column 6 feet high and 1 in. I. D. Unchanged acetaldehyde and crotonaldehyde-water azeotrope were flashed off at the top of the column and condensed. The acetaldehyde was recycled. With an average reaction temperature of 110–112° C. and in 8 hours, 1000 grams of acetaldehyde was converted to 679 grams of crotonaldehyde.

Although formalin was used as a source of formaldehyde in the examples described above, any suitable source of monomeric formaldehyde may be used. Anhydrous formaldehyde can be generated outside of the reactor and as such fed into the reaction mixture.

It may be seen from the above examples that I have provided a convenient and efficient method of continuously producing unsaturated carbonyl compounds by the fluid contact of two different aldehydes with a heated, circulating catalyst solution. This solution may contain only a small amount of a salt of a radical such as $NH_3$, $NH_2$, and NH which is different from those methods in which stoichiometric amounts of amine compound are used and amine aldehydes are produced which require deamination to obtain unsaturated aldehyde.

In the process of the present invention the desired unsaturated aldehyde is obtained free of amine and may be readily oxidized. For example, the methacrolein evolved from the top of the reactor in the process of the present invention may be readily oxidized to methacrylic acid.

Various constructions of columns may be used provided good fluid contact is obtained. Certain other variations will be apparent.

I claim:

1. A process for the preparation of an acroleinic unsaturated aldehyde of the formula $CH_2=C(R)CHO$ where (R) is a member from the group consisting of hydrogen, alkyl and aryl which comprises reacting formaldehyde with another aliphatic aldehyde of the formula (R)$CH_2CHO$, wherein (R) has the significance set forth above, said reaction being carried out by substantially continuously passing the formaldehyde and the other aldehyde to be reacted therewith into contact with a boiling catalyst liquid at a temperature within the range of 80–130° C., said catalyst liquid containing catalytic amounts up to 25% of a salt of a radical from the group consisting of $NH_3$, $NH_2$ and NH carried in an aqueous environment whereby the formation of the acroleinic unsaturated aldehyde is caused to take place and substantially continuously distilling off an azeotrope of the unsaturated aldehyde thus produced.

2. A process of producing acroleinic unsaturated aldehydes of the formula $CH_2=C(R)CHO$ where (R) is a member from the group consisting of hydrogen, alkyl and aryl which comprises reacting formaldehyde with another lower aliphatic aldehyde of the formula (R)$CH_2CHO$, wherein (R) has the significance set forth above, said reaction being accomplished by passing the formaldehyde and the other aldehyde into fluid contact with a cycled heated catalyst heated to fluidity and at a temperature within the range of 60–400° C., said fluid catalyst containing amounts up to 25% of a hydrogen halide salt of an amine as a catalyst, whereby the formation of the acroleinic unsaturated aldehyde is caused to take place, and flashing off this unsaturated aldehyde substantially continuously as it is formed.

3. The process of producing unsaturated aldehydes of the formula $R_1CH=C(R)CHO$ where (R) is a member from the group consisting of hydrogen, alkyl and aryl and $R_1$ has the significance set forth below, which comprises substantially continuously passing a mixture of a lower aliphatic aldehyde with an aldehyde represented by the formula $R_1CH_2CHO$ wherein $R_1$ is a member from the group consisting of hydrogen, alkyl, aryl and aralkyl, into the bottom of a scrubber apparatus countercurrent to a hot fluid solution of a catalyst at a temperature within the range of 80–400° C., said catalyst containing concentrations up to 25% of a salt of a radical from the group consisting of $NH_3$, $NH_2$, and NH whereby the reaction is carried out at a pH between 4–6 and whereby continuous fluid contact with the hot fluid catalyst is obtained with the formation of unsaturated aldehyde reaction products and substantially continuously taking off the vapor of the unsaturated aldehydes at the top of the scrubber and condensing the same.

4. The process of producing unsaturated aldehydes which comprises reacting a lower aliphatic aldehyde from the group consisting of formaldehyde and acetaldehyde with another aldehyde represented by the formula, $R_1CH_2CHO$ wherein $R_1$ is a member from the group consisting of hydrogen, alkyl, aryl, and aralkyl, by a procedure which comprises substantially continuously passing the aforementioned aldehydes which are to be reacted into contact with a heated catalyst solution at a temperature between 95° and 400° C., said catalyst solution containing catalytic amounts up to 25% of a salt of a radical from the group consisting of $NH_3$, $NH_2$, and $NH$, and substantially continuously distilling off from the reaction the azeotrope of the unsaturated aldehyde thus formed.

5. The continuous process of producing unsaturated aldehydes which comprises substantially continuously reacting one mol of a lower aliphatic aldehyde from the group consisting of formaldehyde and acetaldehyde with 1 to 5 molar excess of another aldehyde represented by the formula, $R_1CH_2CHO$ wherein $R_1$ is a member from the group consisting of hydrogen, alkyl, aryl and aralkyl by a procedure which comprises substantially continuously passing a mixture of the aforementioned aldehydes which are to be reacted into countercurrent contact with a flowing and boiling solution of a catalyst at a temperature between 60-400° C., said solution containing catalytic amounts up to 25% concentration of a secondary amine hydrogen halide whereby the formation of an unsaturated aldehyde reaction product to take place in the boiling solution and substantially continuously azeotroping off said unsaturated aldehyde thus formed.

6. The continuous process which comprises continuously feeding a mixture containing formaldehyde and propionaldehyde into a circulating stream of a heated catalyst solution at a temperature between 95° C.-115° C., said catalyst solution containing up to 25% concentration of a salt of a radical from the group consisting of $NH_3$, $NH_2$, and $NH$, whereby methacrolein is formed flashing off and separating methacrolein product from the reaction and thereafter oxidizing the methacrolein to methacrylic acid.

HUGH J. HAGEMEYER, Jr.

References Cited in the file of this patent

UNITED STATES PATENTS

| Number | Name | Date |
|---|---|---|
| 2,230,591 | Fischer et al. | Feb. 4, 1941 |
| 2,345,111 | Grundman | Mar. 28, 1944 |
| 2,485,989 | Smith | Oct. 25, 1949 |
| 2,518,416 | Borthick | Aug. 8, 1950 |

OTHER REFERENCES

Hurd, The Pyrolysis of Carbon Compounds, (1929) pp. 310-13, Chemical Catalog Co.

Mannich et al., Berichte, 65, pp. 378-85 (1932).